US006918563B2

(12) United States Patent
Tseng

(10) Patent No.: US 6,918,563 B2
(45) Date of Patent: Jul. 19, 2005

(54) STAND WITH FOLDABLE LEG UNITS

(75) Inventor: Chuen-Jong Tseng, Chiayi Hsien (TW)

(73) Assignee: Taiwan Shin Yeh Enterprise Co., Ltd., Chiayi Hsien (TW)

( * ) Notice: Subject to any disclaimer, the term of this patent is extended or adjusted under 35 U.S.C. 154(b) by 45 days.

(21) Appl. No.: 10/607,096

(22) Filed: Jun. 26, 2003

(65) Prior Publication Data

US 2004/0262465 A1    Dec. 30, 2004

(51) Int. Cl.[7] .......................................... A47G 23/02
(52) U.S. Cl. ............... 248/146; 248/188.1; 248/188.2; 248/188.6; 248/188.7; 248/188.8; 211/71.01; 108/116; 126/9 R; 126/9 B
(58) Field of Search ............... 211/12, 71.01, 211/85, 203; 126/9 R, 9 B, 30; 248/146, 248/188.1, 188.2, 188.6, 188.7, 188.8, 166, 248/170, 439, 173, 165; 108/116

(56) References Cited

U.S. PATENT DOCUMENTS

| 1,112,558 | A | * | 10/1914 | Red | 248/129 |
| 1,304,405 | A | * | 5/1919 | Tate | 248/150 |
| 2,398,693 | A | * | 4/1946 | Bureau | 108/11 |
| 2,683,014 | A | * | 7/1954 | Sumen et al. | 248/150 |
| 3,559,565 | A | * | 2/1971 | Getz | 99/450 |
| 3,627,242 | A | * | 12/1971 | Vandermast | 248/97 |
| 4,157,174 | A | * | 6/1979 | Hickman et al. | 269/139 |
| 4,505,408 | A | * | 3/1985 | Sagol | 222/185.1 |
| 5,179,932 | A | * | 1/1993 | DeCarlo | 126/9 R |
| 5,465,985 | A | * | 11/1995 | Devan et al. | 280/30 |
| 6,517,035 | B1 | * | 2/2003 | Sellers | 248/146 |
| 6,595,198 | B2 | * | 7/2003 | Mosher et al. | 126/38 |

* cited by examiner

Primary Examiner—Kimberly Wood
(74) Attorney, Agent, or Firm—Ladas & Parry LLP

(57) ABSTRACT

A stand includes a holding frame and a plurality of spaced apart leg units. Each leg unit includes an upper leg having an upper end connected securely to the holding frame and a lower end, and a lower leg having an upper end pivoted to the upper leg adjacent to the lower end of the upper leg so as to be rotatable between a folded position, in which the lower legs are disposed in a storage space defined by the upper legs, and in which the lower ends of the upper legs can be seated on a supporting surface, and an extended position, in which lower ends of the lower legs are disposed at an elevation below the lower ends of the upper legs, and in which the lower ends of the lower legs can be seated on the supporting surface.

4 Claims, 6 Drawing Sheets

US 6,918,563 B2

STAND WITH FOLDABLE LEG UNITS

BACKGROUND OF THE INVENTION

1. Field of the Invention

The present invention relates to a stand, more particularly to a stand with foldable leg units.

2. Description of the Related Art

Referring to FIG. 1, a conventional stand 1 is shown to include a support frame 11 having an oval-shaped holding frame portion 111, a plurality of legs 112,113 extending downwardly from the holding frame portion 111 to stand on a supporting surface, and left and right grip portions 114 extending outwardly and respectively from two opposite sides of the holding frame portion 111. A cooking utensil 12 can be disposed on the holding frame portion 111 of the support frame 11.

The conventional stand is disadvantageous in that the height of the support frame 11 is not adjustable, thereby limiting the range of use of the stand.

SUMMARY OF THE INVENTION

Therefore, the object of this invention is to provide a stand with foldable leg units, which is capable of overcoming the aforesaid disadvantage of the prior art.

According to the present invention, a stand is adapted to stand on a supporting surface, includes a holding frame and a plurality of spaced apart leg units. The holding frame is adapted to support an article thereon. Each of the leg units includes an upper leg and a lower leg. The upper leg extends downwardly from the holding frame and has an upper end connected securely to the holding frame, and a lower end opposite to the upper end. The upper legs of the leg units cooperatively define a storage space below the holding frame. The lower leg has opposite upper and lower ends. The upper end of the lower leg is pivoted to the upper leg at a position adjacent to the lower end of the upper leg so as to be rotatable relative to the upper leg between a folded position, in which the lower legs of the leg units are disposed in the storage space, and in which the lower ends of the upper legs are adapted to be seated on the supporting surface, and an extended position, in which the lower ends of the lower legs are disposed at an elevation below the lower ends of the upper legs, and in which the lower ends of the lower legs are adapted to be seated on the supporting surface.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
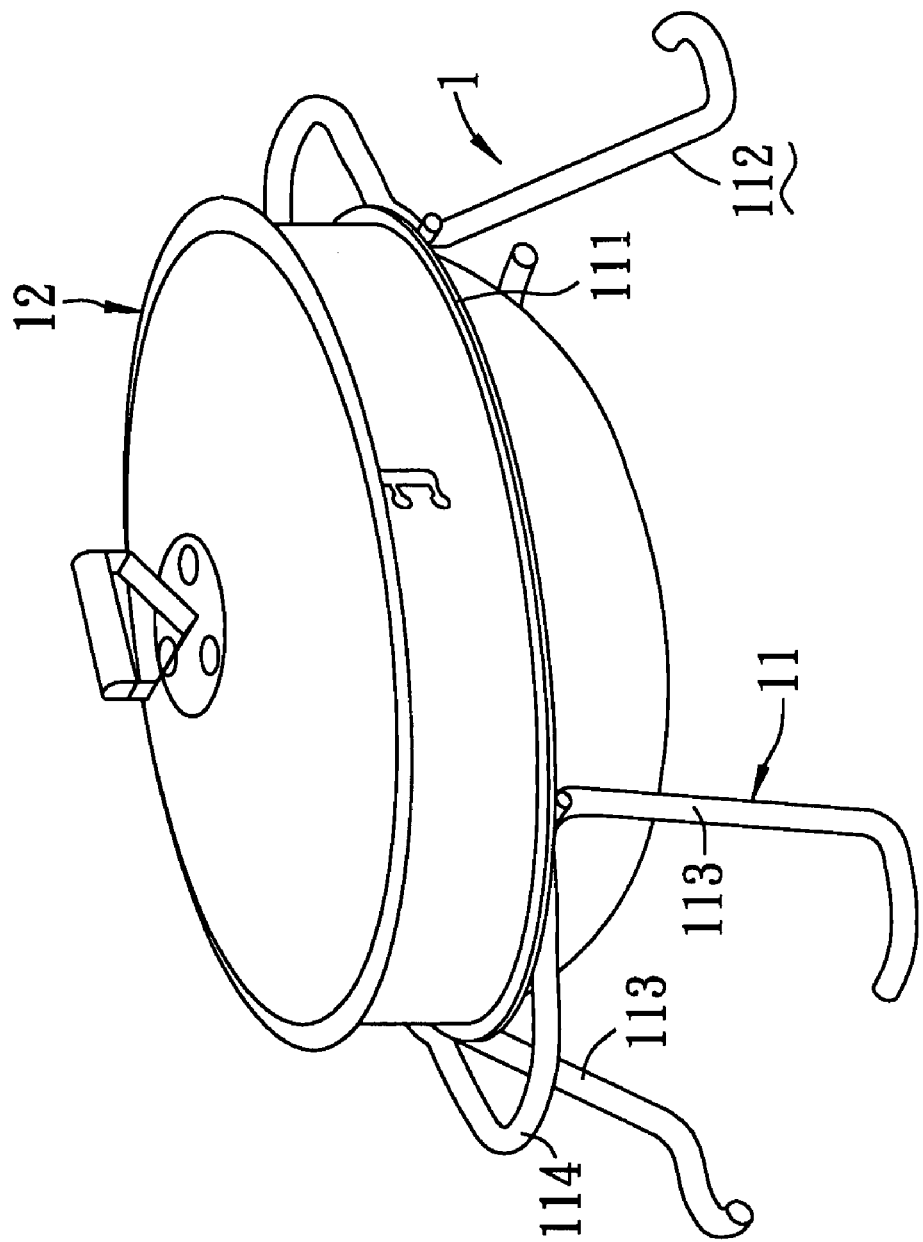
FIG. 1 is a perspective view of a conventional stand when used for supporting a cooking utensil.
Figure 2:
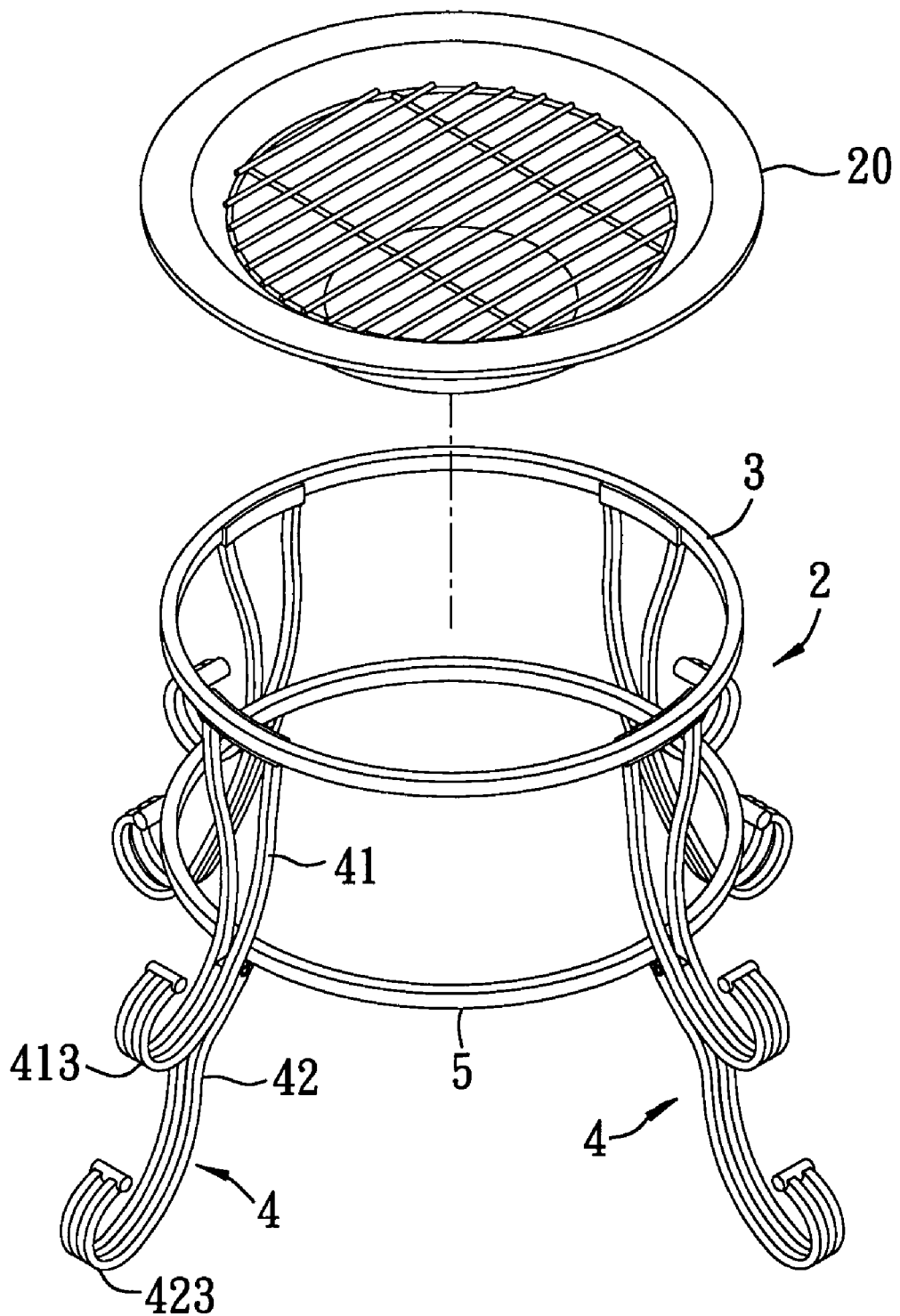
FIG. 2 is a perspective view of the preferred embodiment of a stand according to the present invention in an extended position for supporting a gridiron thereon.
Figure 3:
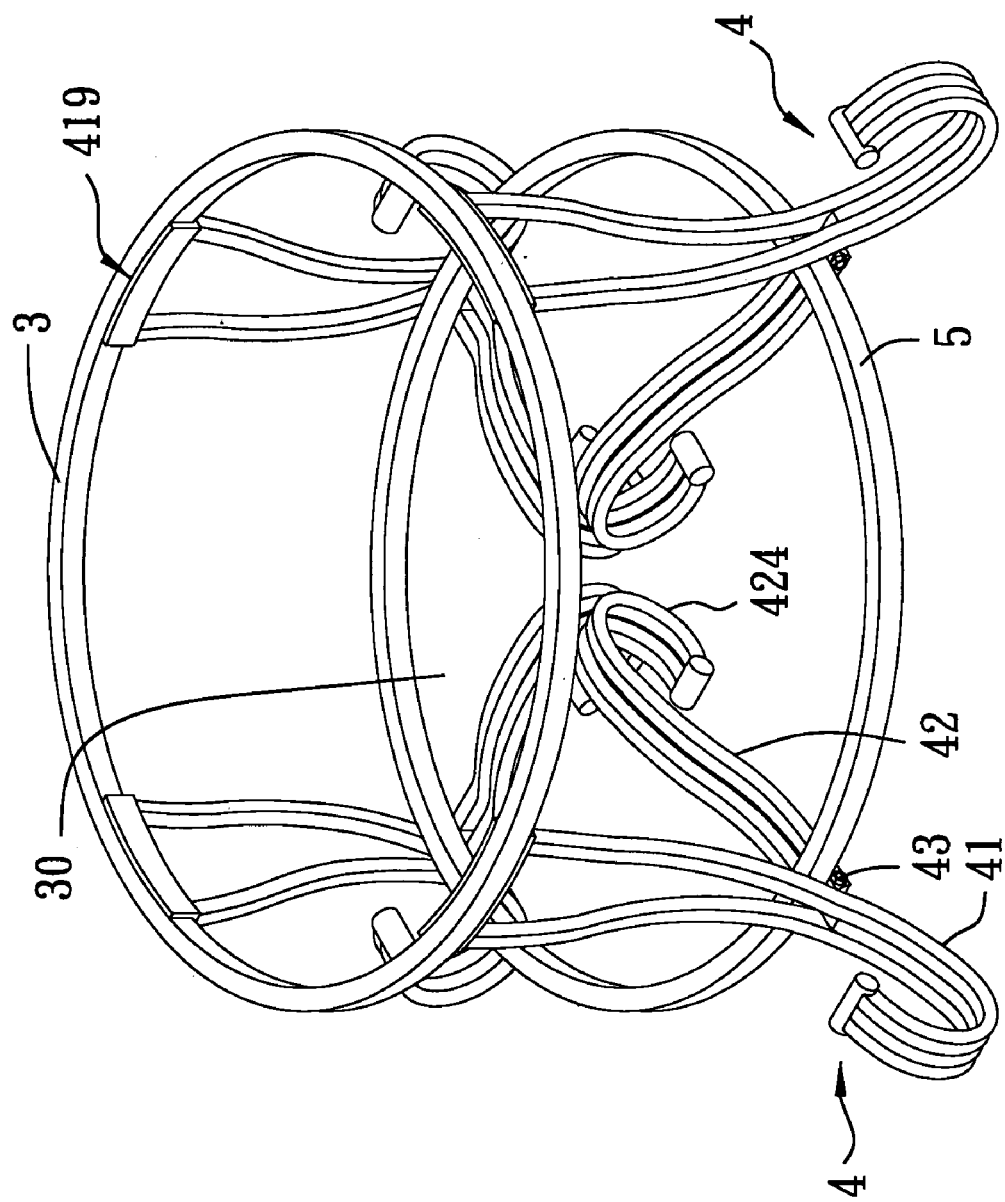
FIG. 3 is a perspective view of the preferred embodiment in a folded position.
Figure 4:
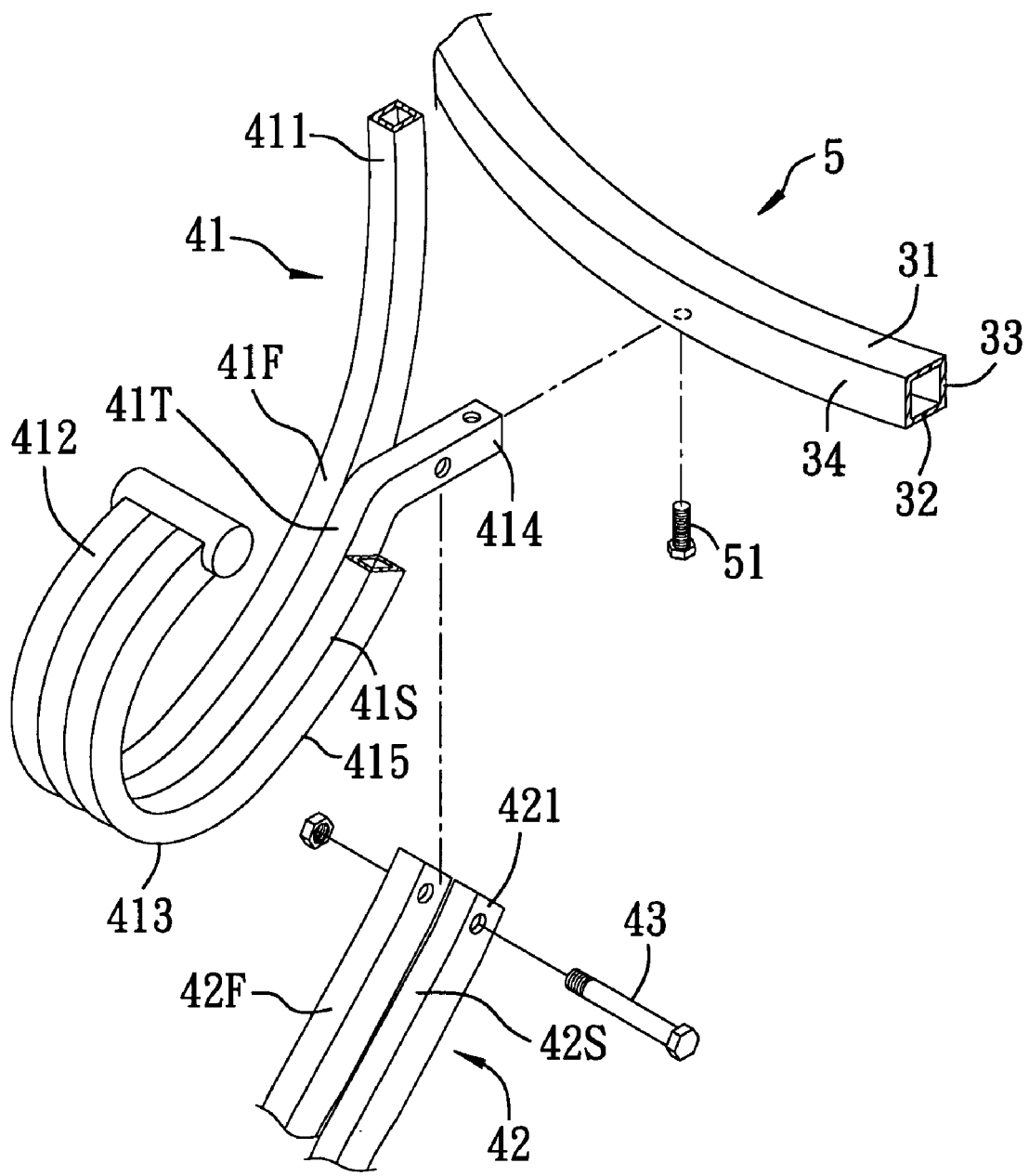
FIG. 4 is a fragmentary, exploded perspective view of the preferred embodiment, illustrating how a lower leg is pivoted to an upper leg.

Referring to FIGS. 2, 3 and 4, the preferred embodiment of a stand 2 according to the present invention is shown to include a metal annular holding frame 3 and a plurality of spaced apart leg units 4.

As illustrated, the holding frame 3 is adapted to support an article 20, such as a gridiron or a cooking utensil. The holding frame 3 is annular in shape and has a rectangular cross-section, and includes an annular inner face 33, an annular outer face 34 opposite to the annular inner face 33, and annular top and bottom faces 31, 32 interconnecting the inner and outer faces 33,34. The holding frame 3 can be oval, rectangular or triangular in shape.

Figure 5:
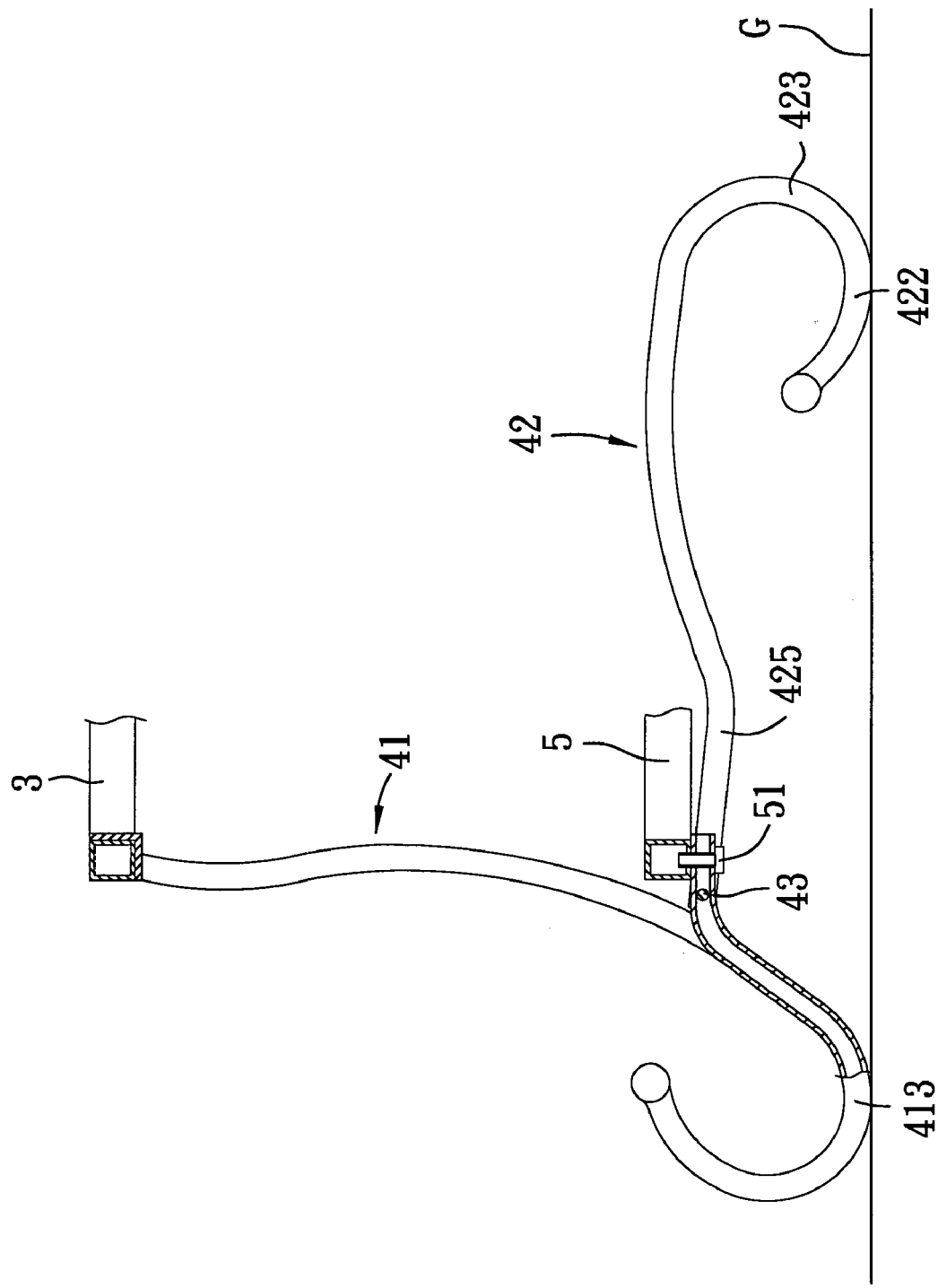
FIG. 5 is a fragmentary, partly sectional side view of the preferred embodiment, in which the lower legs are disposed in the folded position.

Each of the leg units 4 extends downwardly from the holding frame 3, and includes an upper leg 41 that has an upper end 411 connected securely to the holding frame 3, a lower end 413 opposite to the upper end 411, and a C-shaped portion 412 which curves upwardly from the lower end 413 of the upper leg 41. The upper legs 41 of the leg units 4 cooperatively define a storage space 30 below the holding frame 3. Each of the leg units 4 further includes a lower leg 42 having opposite upper and lower ends 421,423, and a C-shaped portion 422 that curves upward from the lower end of the respective lower leg 42. The upper end 421 of the lower leg 42 is pivoted to the respective upper leg 41 at a position adjacent to the lower end 413 of the respective upper leg 41 so as to be rotatable relative to the respective upper leg 41 between a folded position (see FIGS. 3 and 5), in which the lower legs 42 are disposed in the storage space 30, and in which the lower ends 413 of the upper legs 41 are adapted to be seated on a supporting surface (G), and an extended position, in which the lower ends 423 of the lower legs 42 are disposed at an elevation below the lower ends 413 of the upper legs 41, and in which the lower ends 423 of the lower legs 42 are adapted to be seated on the supporting surface (G), as shown in FIG. 2.

Each of the upper legs 41 has a pivot portion 414 that protrudes laterally therefrom into the storage space 30, that is disposed adjacent to the lower end 413 of the respective upper leg 41, and that is parallel to the holding frame 3. Each of the upper legs 41 further has an upper abutting portion 415 that extends downwardly and that is angled away from the pivot portion 414 toward the lower end 413 of the upper leg 41. Each of the lower legs 42 has a lower abutting portion 425 adjacent to the upper end 421 of the respective lower leg 42. Each of the leg units 4 further includes a pivot shaft 43 extending transversely through the pivot portion 414 of a respective one of the upper legs 41 and the upper end 421 of a respective one of the lower legs 42 to permit turning of the lower legs 42 about the respective pivot shafts 43 between the folded and extended positions. When the lower legs 42 are disposed in the extended position, the lower abutting portions 425 of the lower legs 42 respectively abut against the upper abutting portions 415 of the upper legs 41 (see FIG. 6).

Preferably, an annular reinforcing frame 5 is disposed below the holding frame 3, and is fastened to the pivot portions 414 of the upper legs 41 through a plurality of bolts 51 (only one is shown in the drawings) so as to enhance rigidity and stability of the upper legs 41.

In this preferred embodiment, each of the upper legs 41 includes first and second parts 41F,41S and a third part 41T sandwiched between the first and second parts 41F,41S. Each of the first, second and third parts 41F,41S,41T has opposite upper and lower ends. The upper ends of the first and second parts 41F,41S cooperatively define the upper end 411 of the respective upper leg 41. The bottom ends of the first, second and third parts 41F,41S,41T cooperatively define the lower end 413 of the respective upper leg 41. The upper end of the third part 41T defines the pivot portion 414 of the respective upper leg 41. Preferably, the first, second and third parts 41F,41S,41T of each of the upper legs 41 are hollow metal rods that are juxtaposed and that have ends bent to form the C-shaped portion 412 of the respective upper leg 41.

Each of the lower legs 42 includes first and second parts 42F,42S, each of which has opposite upper and lower ends. The upper ends of the first and second parts 42F,42S of each of the lower legs 42 cooperatively define the upper end 421 of the respective lower leg 42. The lower ends of the first and second parts 42F,42S of each of the lower legs 42 cooperatively define the lower end 423 of the respective lower leg 42. The pivot portion 414 of each of the upper legs 41 is sandwiched between the upper ends of the first and second parts 42F,42S of the respective one of the lower legs 42. Preferably, the first and second parts 42F,42S of each of the lower legs 42 are hollow metal rods that are juxtaposed and that have ends bent to form the C-shaped portion 422 of the respective lower leg 42.

Figure 6:
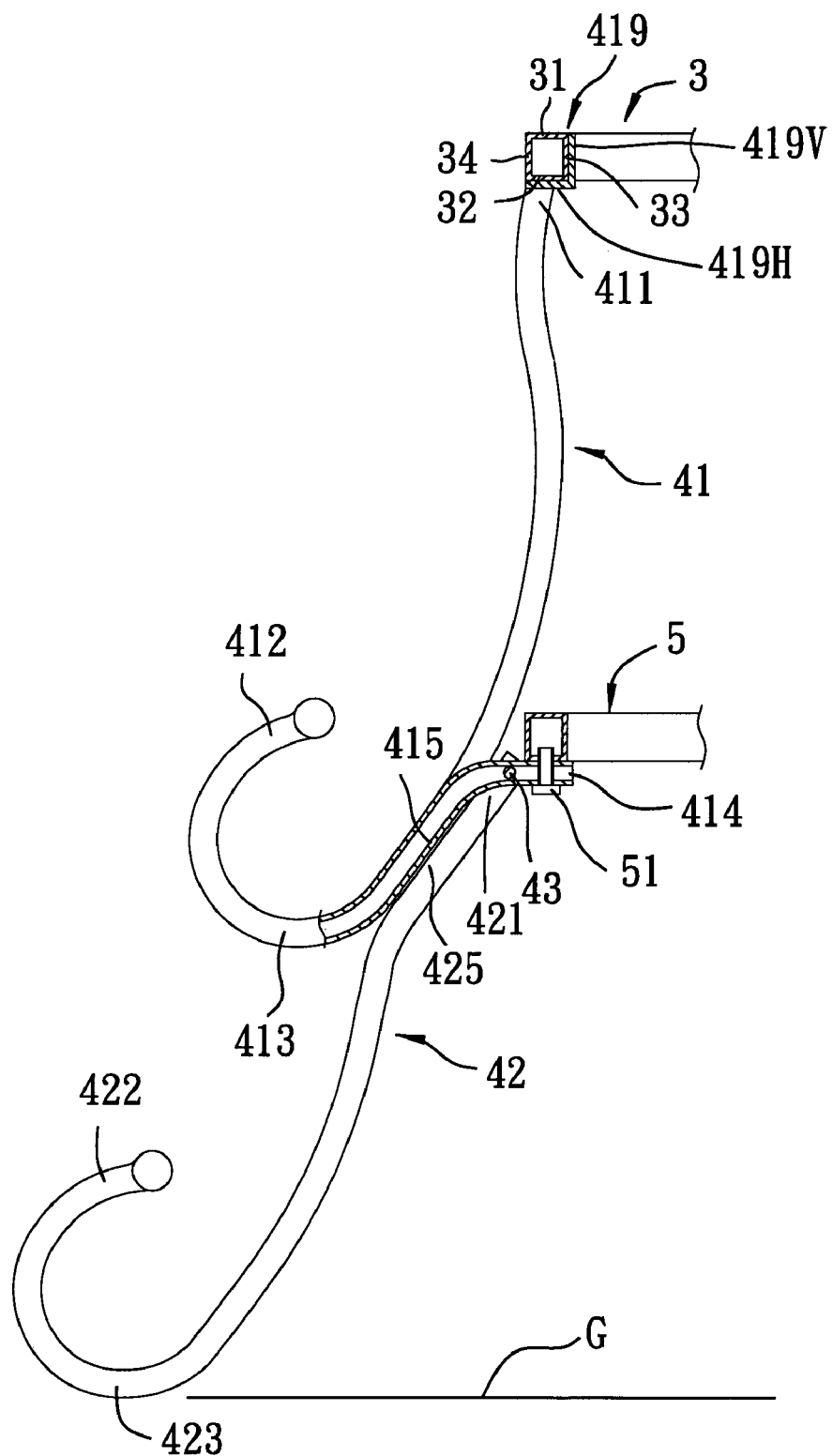
FIG. 6 is a fragmentary, partly sectional side view of the preferred embodiment, in which the lower legs are disposed in the extended position.

Referring to FIG. 6, each of the leg units 4 further includes an L-shaped mounting bracket 419 having a horizontal portion 419H that interconnects the upper ends of the first and second parts 41F,41S of a respective one of the upper legs 41 and the bottom face 32 of the annular holding frame 31, and a vertical portion 419V that extends upward from the horizontal portion 419H and that is secured to the inner face 33 of the annular holding frame 31.

With this invention thus explained, it is apparent that numerous modifications and variations can be made without departing from the scope and spirit of this invention. It is therefore intended that the invention be limited only as indicated in the appended claims.

I claim:

1. A stand adapted to stand on a supporting surface, comprising:
a holding frame adapted to support an article thereon; and a plurality of spaced apart leg units, each of which includes an upper leg and a lower leg, said upper leg extending downwardly from said holding frame and having an upper end connected securely to said holding frame and a lower end opposite to said upper end, said upper legs of said leg units cooperatively defining a storage space below said holding frame, said lower leg having opposite upper and lower ends, said upper end of said lower leg being pivoted to said upper leg at a position adjacent to said lower end of said upper leg so as to be rotatable relative to said upper leg between a folded position, in which said lower legs of said leg units are disposed in said storage space and in which said lower ends of said upper legs are adapted to be seated on the supporting surface, and an extended position, in which said lower ends of said lower legs are disposed at an elevation below said lower ends of said upper legs and in which said lower ends of said lower legs are adapted to be seated on the supporting surface;
wherein said upper leg of each of said leg units has a pivot portion that protrudes laterally therefrom into said storage space, that is disposed adjacent to said lower end of said upper leg, and that is parallel to said holding frame, an upper abutting portion that extends downwardly and that is angled away from said pivot portion toward said lower end of said upper leg, said lower leg of each of said leg units having a lower abutting portion adjacent to said upper end of said lower leg, each of said leg units further including a pivot shaft extending transversely through said pivot portion of a respective one of said upper legs and said upper end of a respective one of said lower legs to permit turning of said lower legs about said pivot shafts between said folded and extended positions, said lower abutting portions of said lower legs respectively abutting against said upper abutting portions of said upper legs when said lower legs are disposed in said extended position;
wherein each of said upper leg of each of said leg units includes first and second parts and a third part sandwiched between said first and second parts, each of said first, second and third parts having opposite upper and lower ends, said upper ends of said first and second parts cooperatively defining said upper end of said upper leg, said lower ends of said first, second and third parts cooperatively defining said lower end of said upper leg, said upper end of said third part defining said pivot portion of said upper leg, said lower leg of each of said leg units including first and second parts, each of which has opposite upper and lower ends, said upper ends of said first and second parts of said lower leg cooperatively defining said upper end of said lower leg, said lower ends of said first and second parts of said lower leg cooperatively defining said lower end of said lower leg, said pivot portion of said upper leg of each of said leg units being sandwiched between said upper ends of said first and second parts of the respective one of said lower legs of said leg units.

2. The stand as defined in claim 1, further comprising a reinforcing frame disposed below said holding frame and connected securely to said pivot portions of said upper legs so as to enhance rigidity and stability of said upper legs.

3. The stand as defined in claim 1, wherein said holding frame is annular in shape and has a rectangular cross-section.

4. The stand as defined in claim 1, wherein said holding frame is annular in shape, has a rectangular cross-section, and includes an annular inner face, an annular outer face opposite to said annular inner face and an annular bottom face interconnecting said inner and outer faces, each of said leg units further including an L-shaped mounting bracket having a horizontal portion that interconnects said upper ends of said first and second parts of a respective one of said upper legs of said leg units and said annular bottom face of said annular holding frame, and a vertical portion that extends upward from said horizontal portion and that is secured to said annular inner face of said annular holding frame.

* * * * *